(12) United States Patent
Tipaldo

(10) Patent No.: US 6,508,195 B1
(45) Date of Patent: Jan. 21, 2003

(54) RETRACTABLE SAFETY MARKER

(76) Inventor: John M. Tipaldo, 405 Beach 132 St., Belle Harbor, NY (US) 11694

( * ) Notice: Subject to any disclaimer, the term of this patent is extended or adjusted under 35 U.S.C. 154(b) by 0 days.

(21) Appl. No.: 09/924,078

(22) Filed: Aug. 8, 2001

(51) Int. Cl.⁷ .................................................. E01F 9/00
(52) U.S. Cl. ...................................... 116/63 P; 40/612
(58) Field of Search ............................. 116/63 P, 63 C, 116/63 T; 40/610, 612; 33/296, 809

(56) References Cited

U.S. PATENT DOCUMENTS

| | | | |
|---|---|---|---|
| 4,531,472 A | * 7/1985 | Marrero et al. | 116/28 R |
| 4,535,331 A | * 8/1985 | Koenig | 340/908 |
| 5,263,272 A | * 11/1993 | Fogelman | 40/591 |
| 5,502,909 A | * 4/1996 | Rabkin | 40/603 |
| 5,517,395 A | * 5/1996 | Weissman | 362/363 |
| 5,544,614 A | * 8/1996 | Cushman | 116/63 P |
| 5,775,253 A | * 7/1998 | Quan et al. | 116/63 T |
| 5,775,833 A | * 7/1998 | Little | 404/9 |

\* cited by examiner

*Primary Examiner*—Diego Gutierrez
*Assistant Examiner*—Tania C. Courson

(57) ABSTRACT

A retractable safety marker is a device designed to provide motorists with advance warning of disabled vehicles and/or work zone areas. The device has been designed to withstand reasonable winds through the use of two base supports, a retractable support element and a partially reflectorized casing made from a porous cloth or nylon type material. The retractable arms allow for the device to easily expand to height consistent with traffic engineering design standards when in operation and then compact when it is in storage. The two base supports are designed not only to provide the necessary structural stability but to also open and close about the retractable support element thus providing for additional compactness.

5 Claims, 8 Drawing Sheets

RETRACTABLE SAFETY MARKER

BACKGROUND AND SUMMARY OF THE INVENTION

This application relates to means of alerting motorists to the presence of disabled vehicles or work zone areas. Each year hundreds of motorists are either killed or injured along side the roadway. Many of these accidents may be prevented if the oncoming motorist had advance warning of the presence of these disabled vehicles.

In recent years, a variety of traffic warning devices have become known and reference may be had to the following U.S. patents for a description of these prior art of traffic warning devices; U.S. Pat Nos. Des. 4,531,472, 5,263,272, 5,502,909, 5,544,614, 5,775,833, 5,517,395, 5,755,253, 4,535,331.

While this has long been recognized as a traffic safety problem many needless deaths continue to happen every year. Current methods of enhancing motorist awareness include; flares, solid plastic cones and retractable triangles. While all devices may accomplish the same goal as the presented invention, the presented invention is designed to help eliminate current difficulties encountered with their use. With roadside flares there is the inherent short fall that they only last a given period of time and are nor reusable. In addition, they are usually only several inches above the roadway service and may present difficulty in operating. Solid plastic cones are easy to place along the roadway however, unless they are properly weighted and sized they may be displaced due to strong gusts of winds. In addition, the larger the cones the more storage space that is required. This is a disadvantage (especially in small passenger vehicles) and therefore reduces their attractiveness of the use. Retractable triangles are difficult to open and may require the motorist to follow detailed instruction prior to use. In addition they also take a significant amount of space when stored. Therefore the presented invention is designed to help eliminate shortfalls with the current devices. It is envisioned that by increasing the attractiveness, more people will carry the devices in their vehicles and a decrease in roadside fatalities and injuries would result.

The Retractable Safety Marker has been designed to be employ easily, store compactly, withstand prevailing winds and be economical.

The Retractable Safety Marker is a combination of four pieces. The first two pieces are referenced to as the base supports. The third piece is a retractable support element and the fourth piece is a casing.

The two base supports are intended to provide the necessary weight to ensure that the device is not displaced under reasonable wind loads. Each base support also has several strategically placed holes and slots. The base support is primarily a rectangular type box with the top end and one of the sides open. The long sides of the base support contain a combination of a hole and a slot adjacent to the "open" end of the box. These holes and slots are designed to allow the base support to be affixed to the upper tabs of the lower portion of the retractable support element.

The third piece is a retractable support element consisting of two retractable arms that are connected to a lower portion and an upper portion. The retractable arms are intended to function in a manner similar to that of an antenna The lower portion of the retractable support element contains four protruding tabs on each side. The upper holes on the two base supports are inserted into the upper protruding tabs of the retractable support element, thus connecting the base supports and the retractable support element. When the base supports are in the open position (parallel to the lower portion), the lower slots on the base support are held in a stable position by the lower tabs on the retractable support element. The lower portion of the retractable support element also contains a raised feature with a continuous indentation encircling the retractable arms. The purpose of this feature is to allow the lower portion of the casing to be held in a fixed position. The upper portion of the retractable support element also contains a continuous indentation, which allows the upper portion of the casing to be held in fixed position.

The fourth piece of the present invention is a casing. The casing is made of a porous cloth or nylon type material similar to netting. The porous material is to allow for the wind to pass through the device thus significantly diminishing the total wind load. The casing itself maybe made partially of reflectorized material and is sized to coincide with the length of the retractable arms in the expanded position. The casing also consists of rubber bands or other similar type devices contained within each end. The casing is held in place by inserting the rubber-banded ends into the continuous indentations on the upper and lower portions of the retractable support element.

The Retractable Safety Marker has been designed for easy placement during emergency situations. The first step in the application process is to rotate the two base supports from the closed to the open position (parallel with the lower portion of the retractable support element). Once the base supports are in a fully extended position, the tabs on the lower portion of the retractable support element in combination of the holes and slots on the base supports are designed to provide the necessary stability. After the base support is fixed in the open position, the arms of the retractable support element (which are in the contracted position) are then expanded by simply pulling in a vertical manner the upper portion of the retractable support element away from the lower portion. This is continued until the retractable arms are in fully extended position. At this point the invention is ready for application.

BRIEF DESCRIPTION OF THE DRAWINGS

The subject matter which is regarded as the present invention is particularly pointed out and distinctly claimed in the concluding portion of the specification. The invention, however, both as to organization and method of practice, may be best understood by reference to the detailed description, taken in conjunction with the accompanying drawings, in which:

DETAILED DESCRIPTION

Reference will now be made to the drawings in which the various elements of the present invention will be given numerical designations. In its present form the invention consists of several distinct elements. These elements when combined as described within will allow one of ordinary skill in the art to made and use the present invention.

Figure 1:
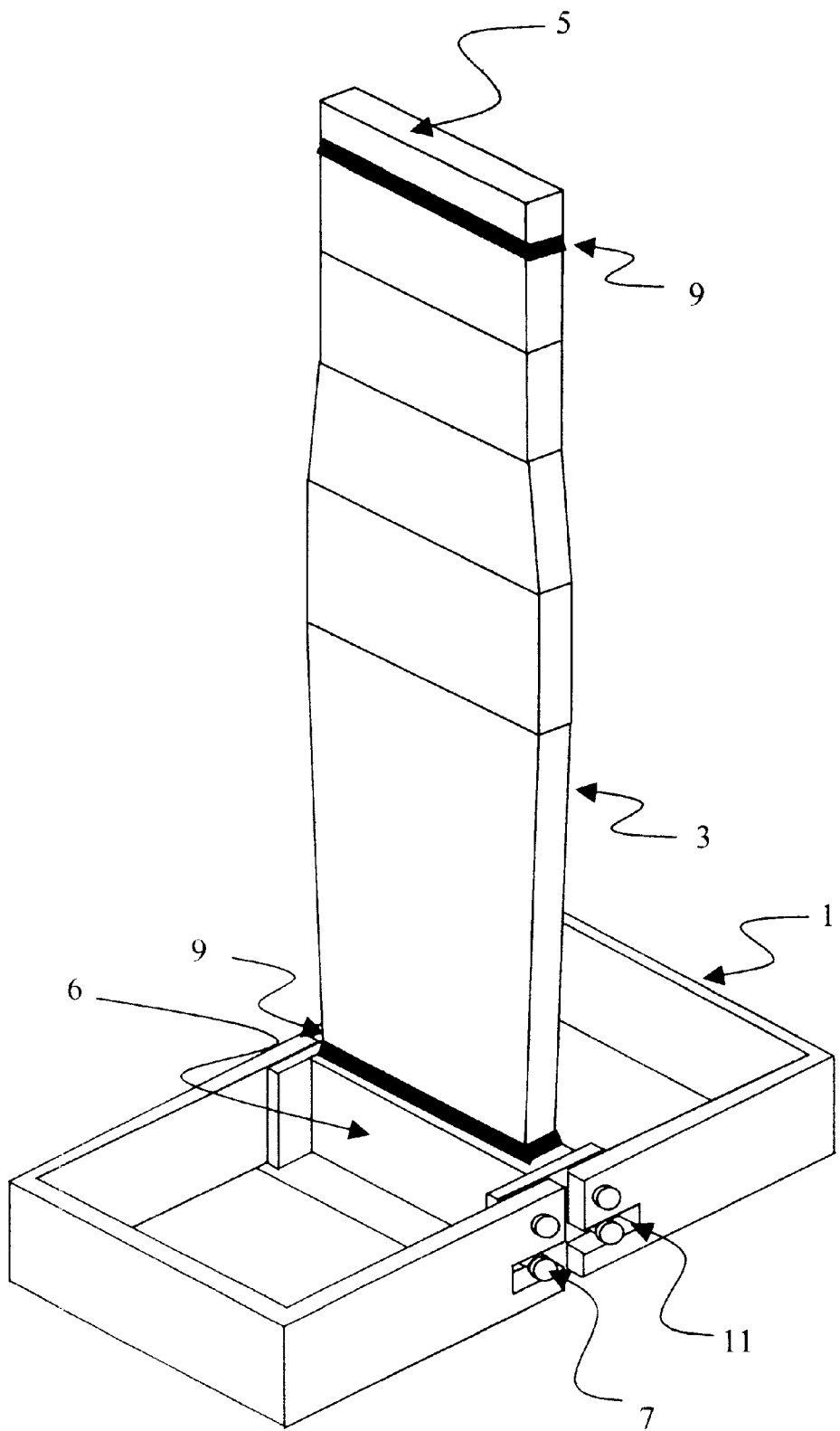
FIG. 1. Illustrates a perspective view of the invention in the expanded and open position.

FIG. 1 illustrates a perspective view of the present invention in the "expanded" and "open" position.

Figure 2:
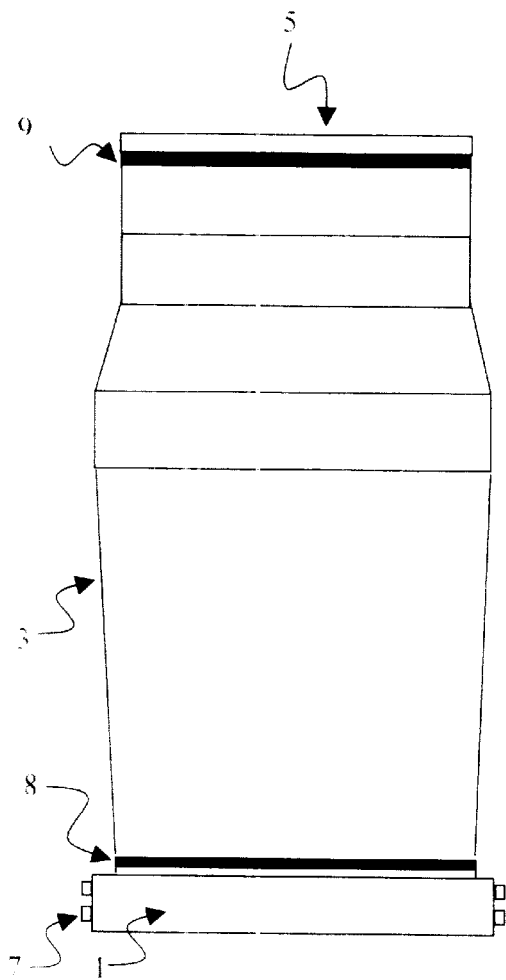
FIG. 2. Illustrates a plan view of the invention in the expanded and open position.

FIG. 2 illustrates a plan view of the present invention in the "expanded" and "open" position.

Figure 3:
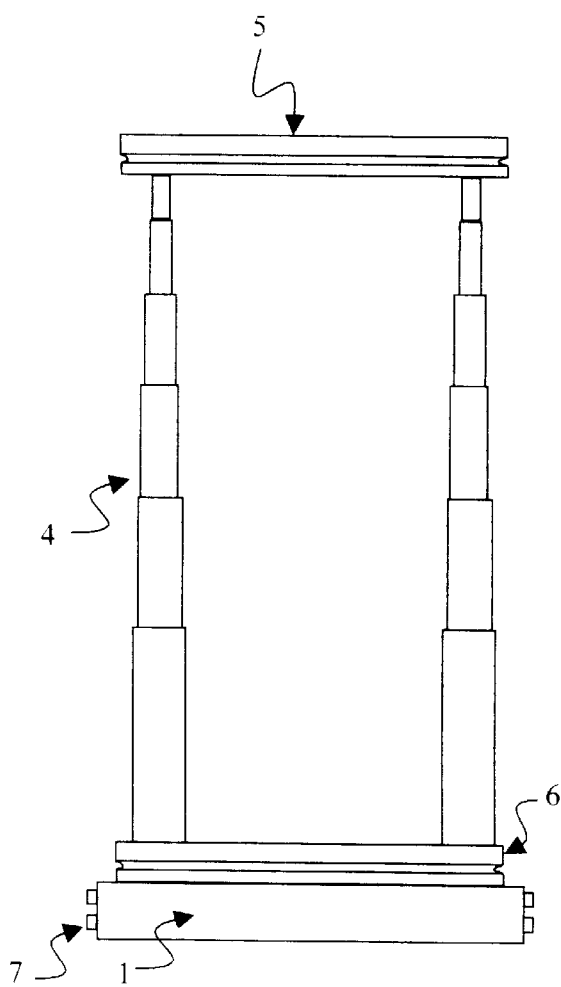
FIG. 3. Illustrates a plan view of the base support and retractable support element in the expanded and open position.
Figure 4:
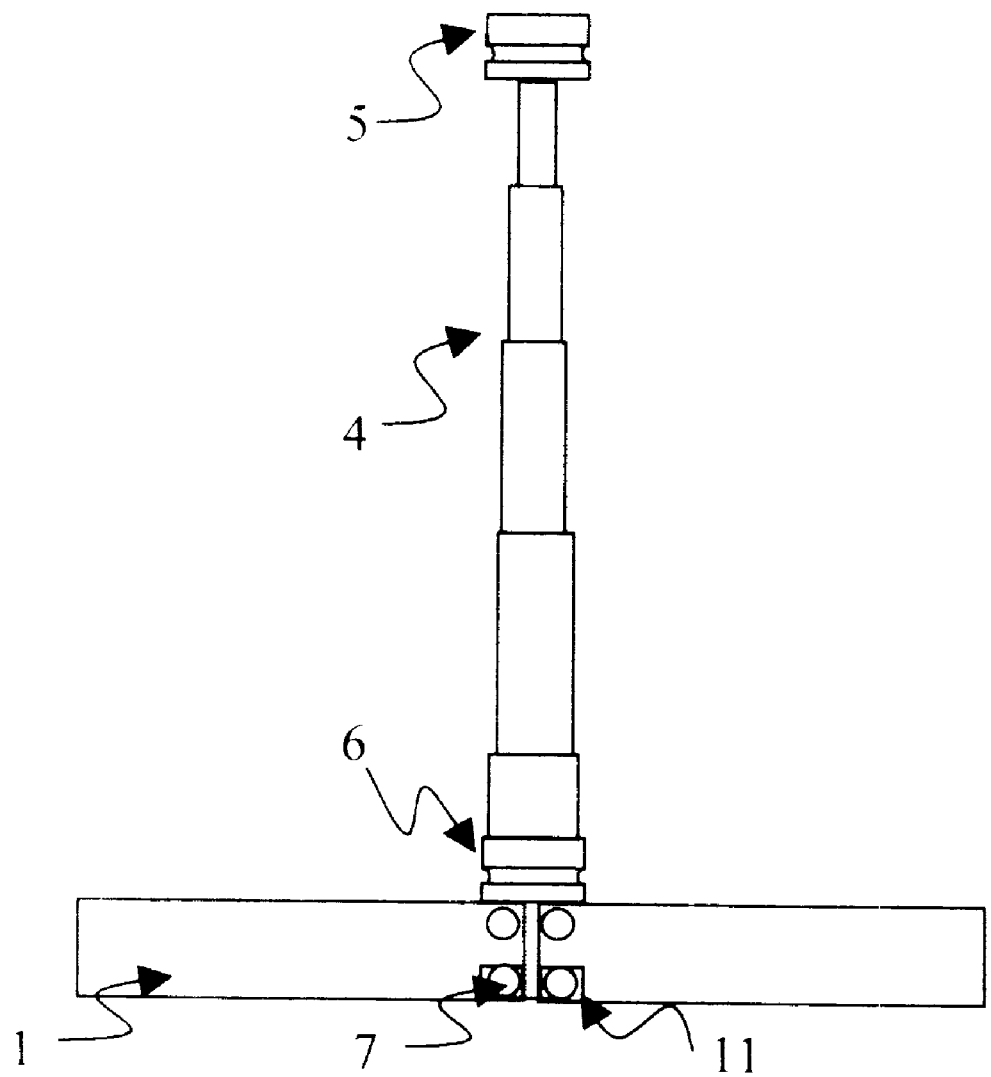
FIG. 4. Illustrates a side view of the base support and retractable support element in the expanded and open position.
Figure 5:
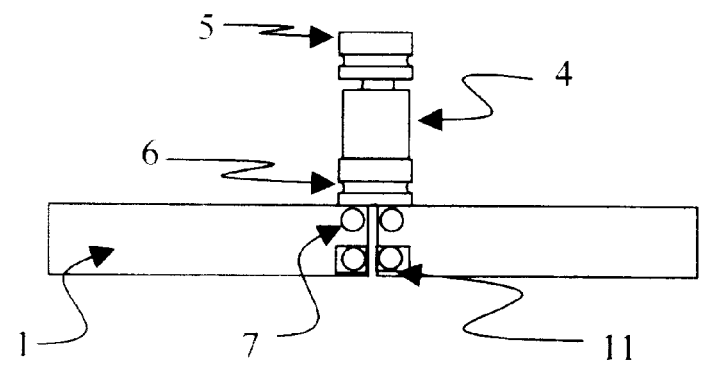
FIG. 5. Illustrates a side view of the base support and retractable support element in the contracted and open position.

FIG. 3 is a plan view of the retractable support element (2) and the base supports (1) in the "expanded" and "open" position. FIG. 4 is a side view of the retractable support element (2) and the base supports (1) in the "expanded" and "open" positions respectively. FIG. 5 is a side view of the retractable support element (2) in the "contracted" position and the base supports (1) in the "open" position.

Figure 6:
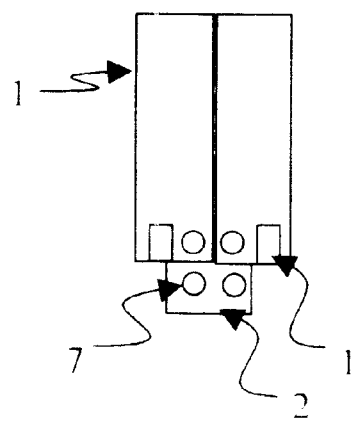
FIG. 6. Illustrates a side view of the invention in the contracted and closed position.
Figure 7:
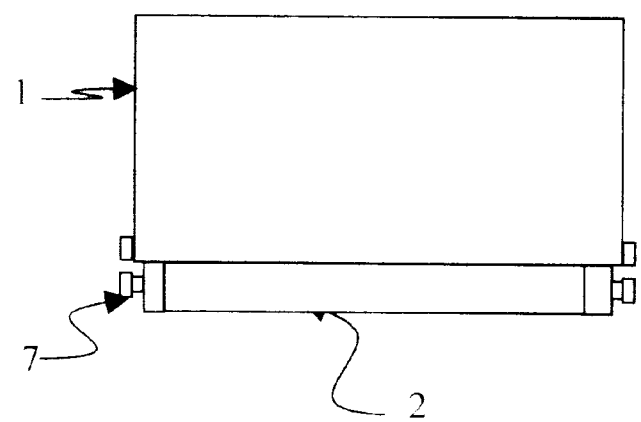
FIG. 7. Illustrates a plan view of the invention in the contracted and closed position.

FIG. 6 is a side view of invention in the "contracted" and "closed" positions. FIG. 7 is a plan view of the invention in the "contracted" and "closed" positions.

Figure 8:
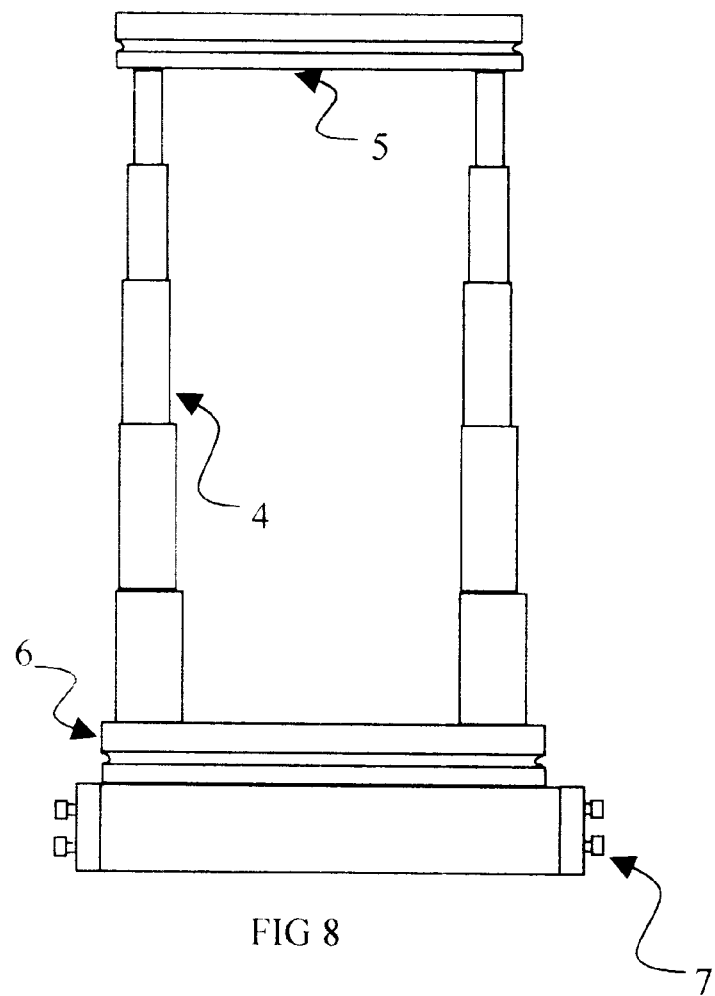
FIG. 8. Illustrates a plan view of the retractable support element in the expanded position.
Figures 9, 10:
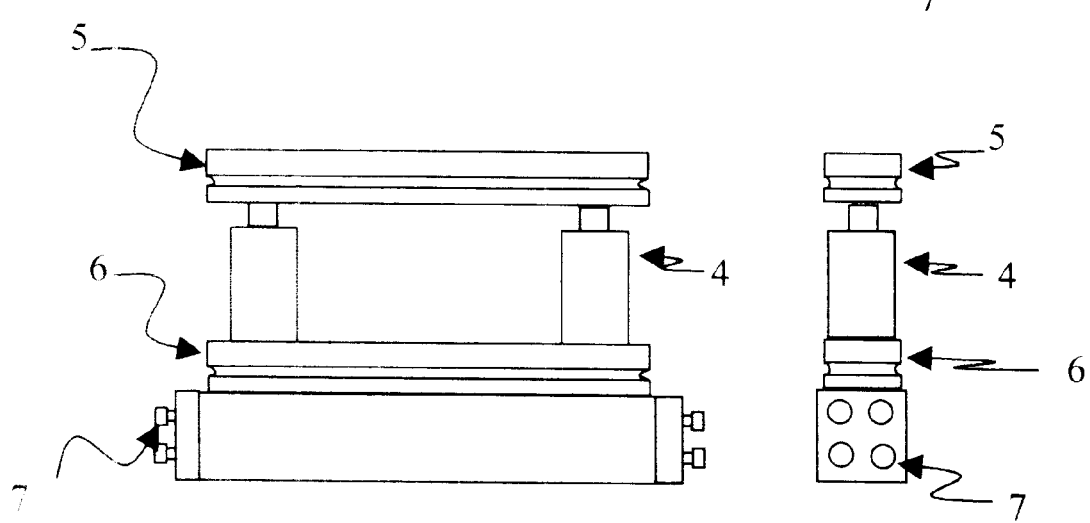
FIG. 9. Illustrates a plan view of the retractable support element in the contracted position.
FIG. 10. Illustrates a side view of the retractable support element in the contracted position.
Figure 15:
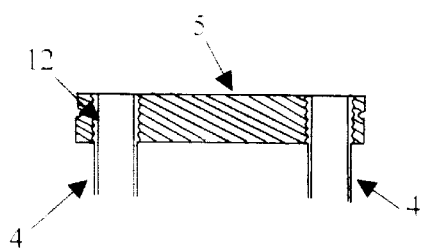
FIG. 15. Illustrates a cross sectional view of the retractable support element shown in FIG. 14 taken across line A—A, detailing a threaded connection between the upper element and the retractable arms.
Figure 17:
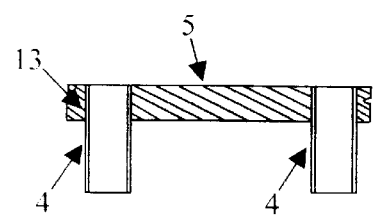
FIG. 17. Illustrates a cross sectional view of the retractable support element shown in FIG. 14 taken across line A—A, detailing a press-fit connection between the upper element and the retractable arms.
Figure 16:
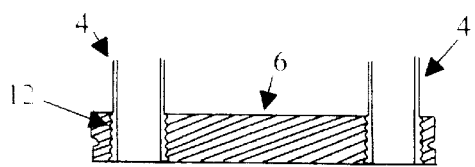
FIG. 16. Illustrates a cross sectional view of the retractable support element shown in FIG. 14 taken across line B—B, detailing a threaded connection between the lower element and the retractable arms.
Figure 18:
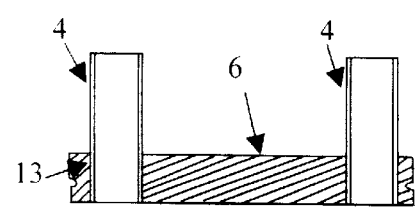
FIG. 18. Illustrates a cross sectional view of the retractable support element shown in FIG. 14 taken across line B—B, detailing a press-fit connection between the lower element and the retractable arms.

FIG. 8 illustrates a plan view of the retractable support element (2) in the "expanded" position. The retractable support element contains 2 retractable arms (4), an upper portion (5), a lower portion (6) and four protruding tabs (7) on each side. The upper portion (5) of the retractable support element (2) contains a continuous indentation encircling its width. The lower portion (6) of the retractable support element (2) contains a raised feature with a continuous indentation encircling the retractable arms. FIG. 9 illustrates a plan view of the retractable support element (2) in the "contracted" position. FIG. 10 illustrates a side view of the retractable support element (2) in the "contracted" position. The retractable support element (2) may either be comprised of a single premolded piece or be constructed from a separate upper portion (5), 2 retractable arms (4) and a lower portion (6). To construct the retractable support element (2) either "press-fit" or "threads" may be employed to connect the separate pieces. FIG. 15 illustrates a threaded connection (12) between the upper portion (5) and the retractable arms (4). FIG. 17 illustrates a press-fit connection (13) between the upper portion (5) and the retractable arms (4). FIG. 16 illustrates a threaded connection (12) between the lower portion (6) and the retractable arms (4). FIG. 18 illustrates a press-fit connection (13) between the lower portion (6) and the retractable arms (4).

Figure 11:
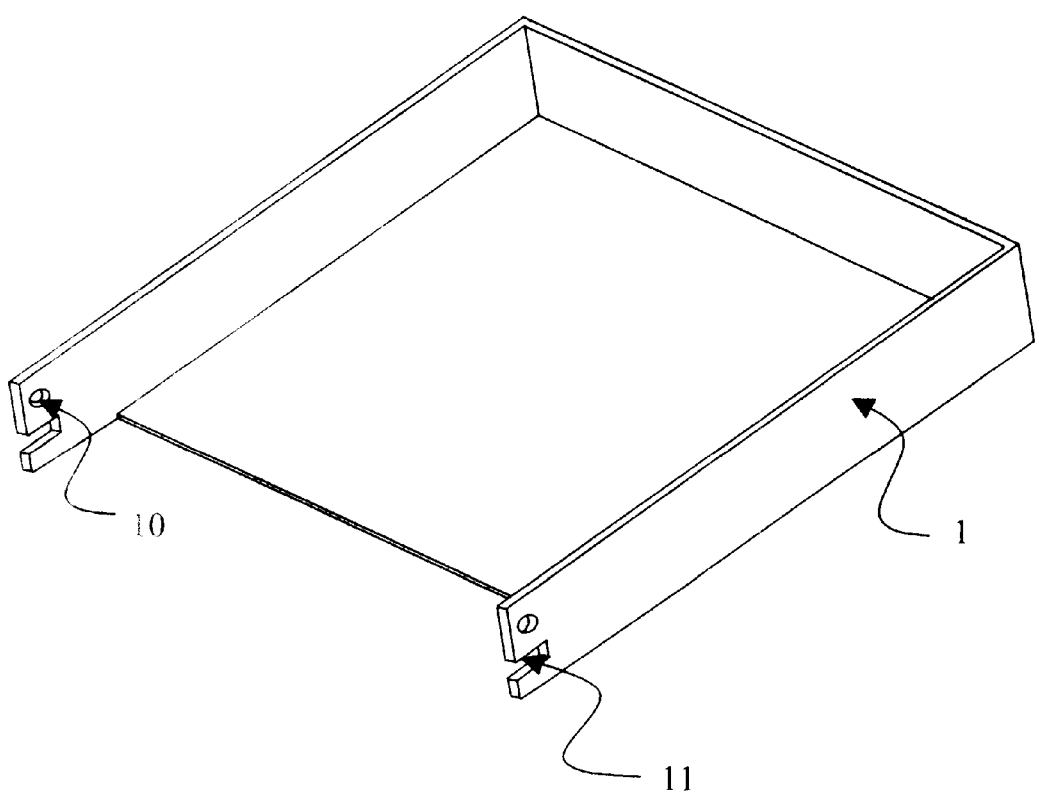
FIG. 11. Illustrates a perspective view of the base support.

FIG. 11 illustrates a perspective view of the base support (1). The base support (1) has a pre-cut hole along the top half (10) and a pre-cut slot (11) along the bottom half.

Figure 12:
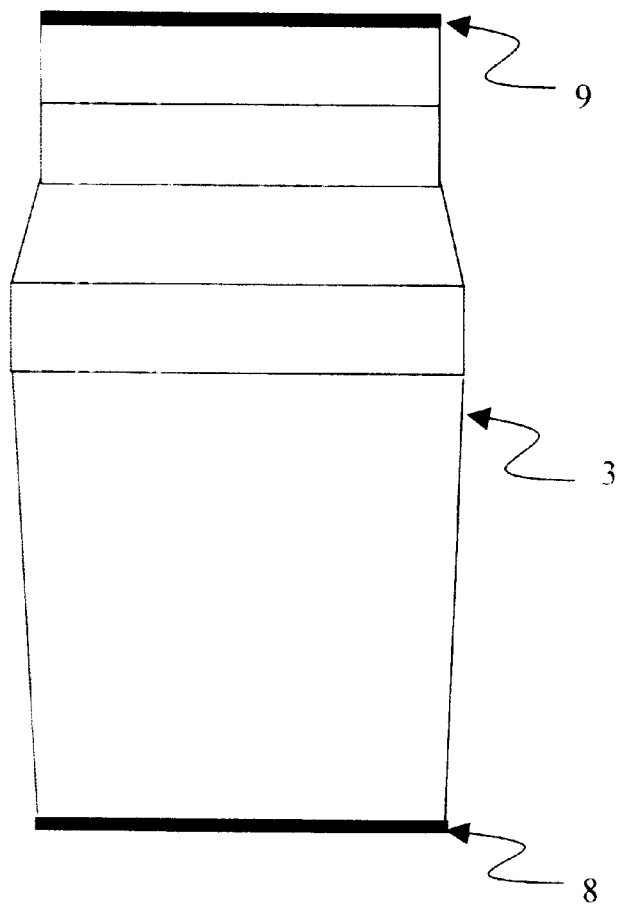
FIG. 12. Illustrates a plan view of the casing
Figure 13:
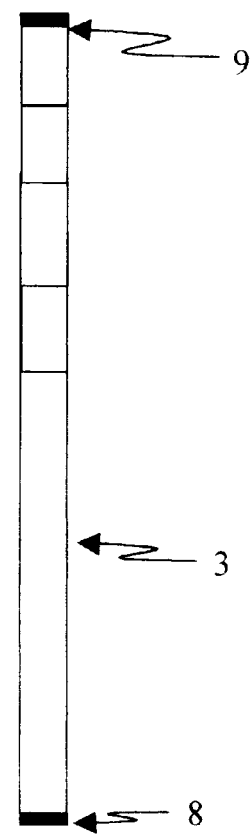
FIG. 13. Illustrates a side view of the casing.
Figure 14:
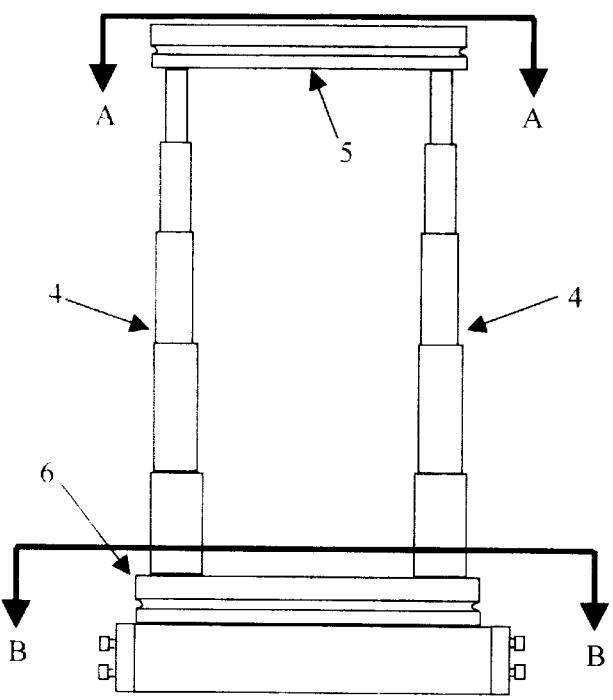
FIG. 14. Illustrates a plan view of the retractable support element, showing cross sectional lines A—A and B—B.

FIG. 12 illustrates a plan view of the casing (3) in the "open" position. The casing is to be made from a compressible sheer or mesh type material capable of allowing wind to pass through its body. The casing (3) also consists of rubber bands or other similar type devices including double sided tape or VELCRO® (hook and loop fasteners) which are contained within its lower and upper ends (8,9). The purpose of the rubber bands or similar type binding elements is to secure the upper and lower portions of the casing (3) to the upper portion (5) and the lower portion (6) of the retractable support element (2). FIG. 13 illustrates a side view of the casing (3) in the "open" position.

In constructing the present invention, the base supports (1) and the retractable support element (2) are permanently attached via the use of the pre-cut holes (10) on the base support (1) and the upper protruding tabs (7) on the retractable support element (2). The upper protruding tabs (7) of the retractable support element (2) are inserted into the precut holes (10) of the base support (1). This method of connection allows for the base supports (2) to partially rotate about the upper protruding tabs (7) of the retractable support element (1). When the present invention is in the "closed" position the base supports (1) are parallel to each other. When placing the present invention into the "open" position the base supports (1) are rotated downward until the lower protruding tabs (7) of the retractable support element (2) are inserted into the "pre-made" slots (11) of the base support (1). When this process is complete, the base supports (1) are approximately perpendicular to the retractable support element (2). This combination of the tabs and slots allows for the present invention to be held in a fixed position.

Once the base supports (1) and the retractable support element (2) are permanently affixed, the casing (3) is then inserted over the retractable support element (2). The rubber banded upper end (9) of the casing (3) is inserted into the continuous indentation of the upper portion (5) of the retractable support element (2). The rubber banded lower end (8) of the casing is then inserted into the continuous indentation of the lower portion (6) of the retractable support element (2). The compressive pressure from the expanded rubber bands placed within the continuous indentation allows for the casing (3) to remain affixed to the retractable support element (2). Since the casing (3) is to be made from a compressible sheer or mesh type material when the retractable arms (4) of the retractable support element (2) are in the "compressed" position the casing (3) remains affixed to the retractable support element (2).

To employ the present invention, the user needs only to "open" or rotate the base supports (1) about the retractable support element (2) until the protruding tabs (7) of the retractable support element (2) are firmly within the lower "pre-cut" slots (11) of the base supports (1). Once this is completed, the user simply lifts the upper portion (5) of the retractable support element (2) until the retractable arms (4) are fully extended. At this point the present invention is ready for application.

While a presently preferred embodiment of my invention is disclosed in this specification it is to be understood that the invention is not limited to the preferred embodiments disclosed but has the breadth of the appended claims.

What is claimed:

1. A retractable safety marker comprising:

two separate base supports that are rectangularly shaped, each base support having a bottom with no top, two long sides and one short side, the long sides of the base support containing a combination of a hole in its upper portion and a slot in its lower portion on the side adjacent to the open side of each base support, a retractable support element comprised of an upper portion which has a continuous indentation encircling its width, two retractable arms, a lower portion including a continuous indentation encircling the base of the two retractable arms and two upper and two lower protruding tabs at each side, the upper protruding tabs of the retractable support element being inserted into the holes of the upper portions of the base supports, thereby permanently attaching the two base supports to the retractable support element, a semi-rectangular shaped casing made of a porous material, with a rubber-band type element affixed within its upper and lower ends;

the casing being fitted over the retractable support element;

the upper and lower ends of the casing being inserted into the continuous indentations of the upper and lower portions of the retractable support element;

wherein the compressive force of the rubber-band type elements of the upper and lower ends of the casing holds the casing affixed to the upper and lower portions of the retractable support element.

2. The retractable safety marker of claim 1, wherein the retractable support element is constructed by connecting the two retractable arms into pre-made holes in the upper and lower portions of the retractable support element by press-fit.

3. The retractable safety marker of claim 1, wherein the retractable support element is constructed by connecting threaded ends of the retractable arms into pre-made threaded holes in the upper and lower portions of the retractable support element.

4. The retractable safety marker of claim 1, wherein the casing attaches to the upper and lower portions of the retractable support element by use of VELCRO®.

5. The retractable safety marker of claim 2, wherein the casing attaches to the upper and lower portions of the retractable support element by use of VELCRO®.

* * * * *